Dec. 19, 1967     E. L. PARR     3,358,930

TURBINE WATER SPRINKLER

Filed Dec. 6, 1965

INVENTOR.
EDWARD L. PARR
BY
FULWIDER, PATTON, RIEBER, LEE & UTECHT
ATTORNEYS 3,358,930
TURBINE WATER SPRINKLER
Edward L. Parr, 301 N. Cuyamaca,
El Cajon, Calif. 92020
Filed Dec. 6, 1965, Ser. No. 512,578
4 Claims. (Cl. 239—210)

ABSTRACT OF THE DISCLOSURE

A spray nozzle including a housing having an elongated passage extending from one end of the housing to the opposite end, the housing also forming a cylindrical chamber whose axis is disposed transversely relative to the elongated passage, a chord of the cylindrical chamber extending into and forming a part of the passage. A cylinder is disposed in the chamber with a chord thereof in the chord of the chamber, the periphery of the cylinder being spirally grooved.

---

The present invention relates generally to a spray nozzle and more specifically to a spray nozzle that might be used to spray a lawn or garden.

The spray nozzle of this invention essentially comprises a housing that forms a chamber and includes an inlet through one side and an outlet through the opposite side. A cylindrical member is disposed within the chamber and between said inlet and outlet and includes a spiral groove extending around its periphery. Said cylindrical member is maintained freely rotatable with opposite sides facing the inlet and outlet and with its major diameter spaced laterally from the inlet.

Other features and the advantages of the present invention will be apparent from the following description, reference being had to the accompanying drawing wherein a preferred embodiment of the invention is illustrated.

Figure 1:
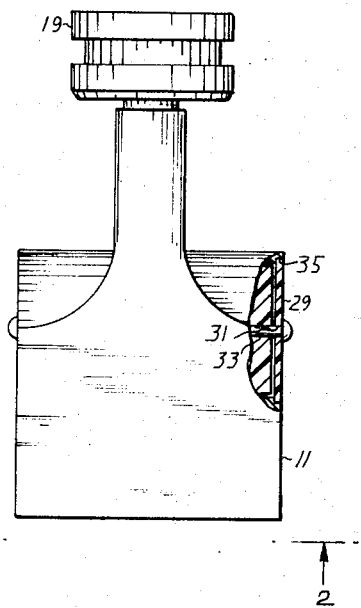
FIG. 1 is a top view of the spray nozzle of the present invention.
Figure 2:
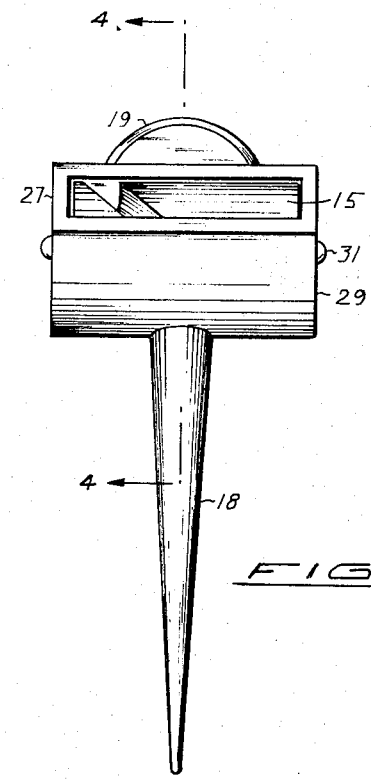
FIG. 2 is an end view of the spray nozzle shown in FIGURE 1.
Figure 3:
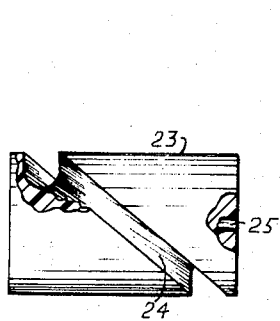
FIG. 3 is a detailed view of the spirally grooved cylindrical member.
Figure 4:
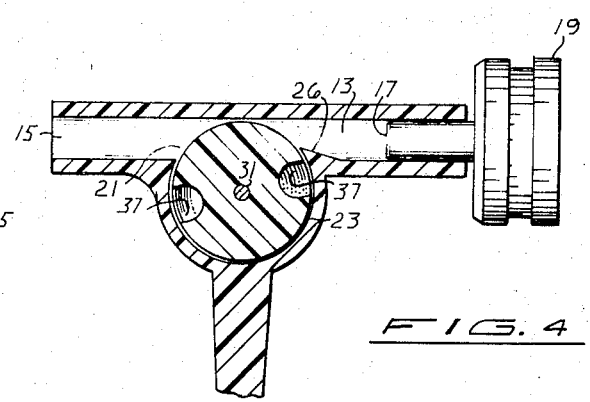
FIG. 4 is a sectional view of the spray nozzle shown in FIG. 1.

Referring more in detail to the drawing, the housing 11 includes an elongated passage extending from one end of the housing to the opposite end, one end of the passage forming an inlet 13 and the other end forming an outlet 15. The inlet and outlet are in straight alignment. The housing is preferably made of plastic and the inlet 13 is shaped to co-operate with the extension 17 of a commercial garden hose fitting 19 to form an interconnection therewith. The housing 11 forms a cylindrical chamber 21, the axis thereof being transverse to the elongated passage, a chord thereof forming a part of the passage and interposed between the inlet 13 and outlet 15. The outlet 15 is preferably rectangular in shape and extends horizontally. Said housing preferably includes an extending stake 18 that is adapted to be driven into the ground to support said housing. A cylindrical member 23 is maintained freely rotatable within the chamber 21, the axis thereof coinciding with the axis of the chamber and a chord thereof extends into the said chord of the chamber. Said cylindrical member includes a spiral groove 24 that extends around its periphery and preferably from one end of the member to the other. The housing 11 preferably includes a lip 26 on the inlet side of the chamber 21, that is adapted to direct the water flow tangential to the cylindrical member 23.

In the preferred embodiment the cylindrical member includes a hole 25 extending longitudinally through the center. The end walls 27 and 29 of the chamber 21 also preferably include holes 31 extending therethrough. A shaft 33 is adapted to extend through the holes 25 and 31 and serve as a bearing to support the cylindrical member 23. One end of the chamber 21 is preferably removable and is adapted to be maintained against a shoulder 35 included in the housing 11.

From the foregoing, it will be apparent that when water under pressure is introduced through the inlet 13, said water will flow through the spiral groove 24 and out of the opening 15. The pressure of this water on the facing surface 37 of said groove 24 will rotate the cylindrical member 23 and as said member rotates, the water passing through the groove 24 will be forced to exit the outlet 15 at longitudinally progressing locations along the length of said outlet.

While the form of embodiment herein shown and described, constitutes preferred form, it is to be understood that other forms may be adopted falling within the scope of the claims that follow.

I claim:
1. A spray nozzle for spraying a fluid comprising in combination:
    (A) a housing having:
        (1) an elongated passage extending from one end of the housing to the opposite end, one end providing an inlet and the opposite end an outlet;
        (2) a cylindrically shaped chamber interposed between the inlet and the outlet, the axis of the chamber being transverse with respect to the passage, a chord of the chamber forming an intermediate part of the passage;
    (B) a cylindrical member disposed for rotation within the chamber, the axis thereof being coincident with that of the chamber, a chord of the member extending into said chord of the chamber, said member being spirally grooved in the periphery thereof substantially through the width of the periphery,
        (1) said cylindrical member being rotated solely by the passage of fluid between the inlet and outlet.

2. A spray nozzle as defined in claim 1, characterized in that the inlet and outlet of the passage are in a straight line.

3. A spray nozzle as defined in claim 1, characterized in that the axis of the cylinder extends horizontally and that the outlet is elongated horizontally.

4. A spary nozzle as defined in claim 3, characterized to include:
    (C) a stake connected with the housing and extending vertically therebelow.

References Cited
UNITED STATES PATENTS

| | | | |
|---|---|---|---|
| 1,081,688 | 12/1913 | Mohl | 239—469 X |
| 1,098,721 | 6/1914 | Hallsworth | 239—383 |
| 1,873,622 | 8/1932 | Moran | 239—383 X |
| 1,882,241 | 10/1932 | Curran. | |
| 2,558,376 | 6/1951 | Opp et al. | 239—563 X |
| 3,136,324 | 6/1964 | Yendley | 239—538 X |
| 3,146,953 | 9/1964 | Komanns | 239—538 |

M. HENSON WOOD, Jr., *Primary Examiner.*
VAN C. WILKS, *Assistant Examiner.*